Dec. 13, 1938.    R. A. WEBSTER    2,140,438
FILM DEVELOPING METHOD
Filed Dec. 21, 1933    2 Sheets-Sheet 1
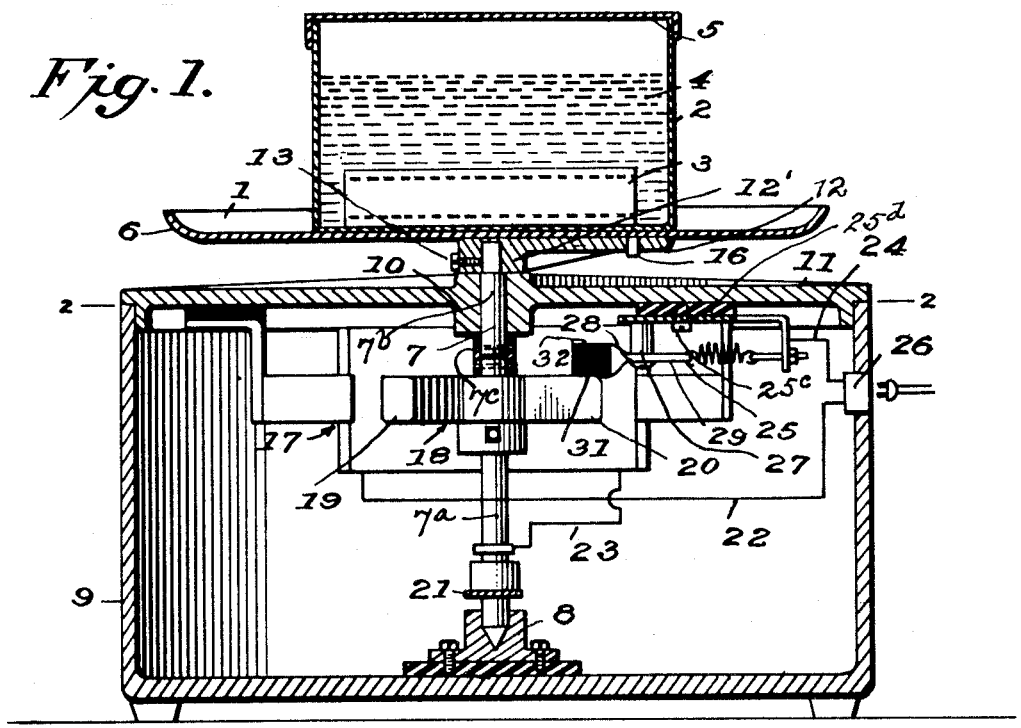
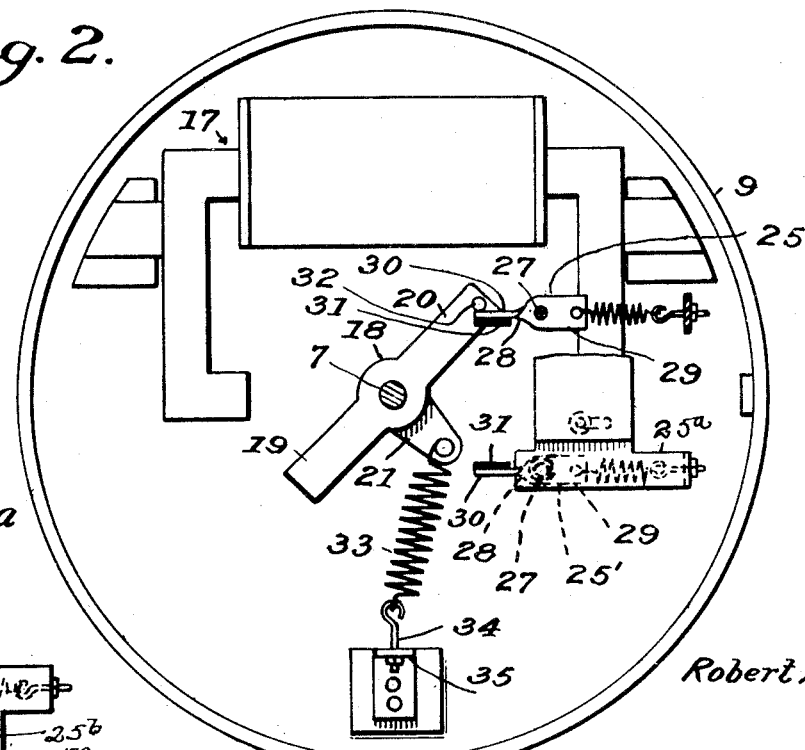
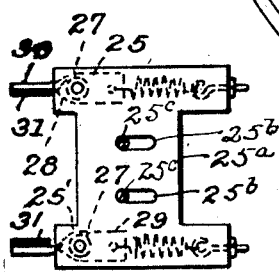
Inventor
Robert A. Webster
By
Attorney Dec. 13, 1938.   R. A. WEBSTER   2,140,438
FILM DEVELOPING METHOD
Filed Dec. 21, 1933   2 Sheets—Sheet 2
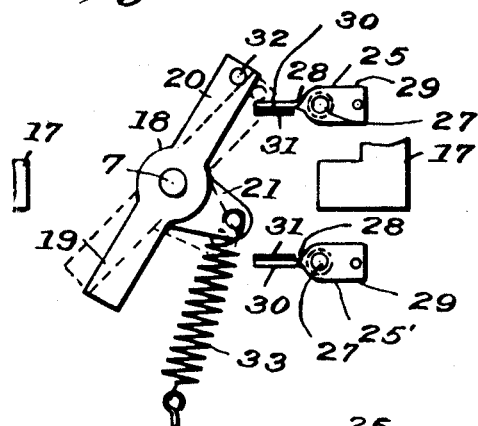
Fig. 3.
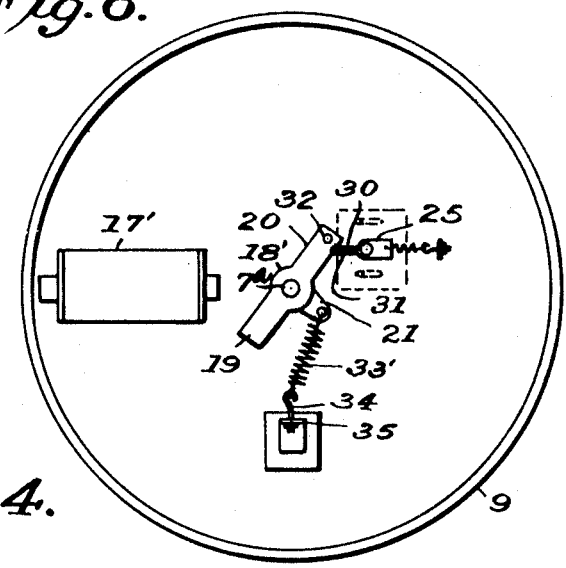
Fig. 8.
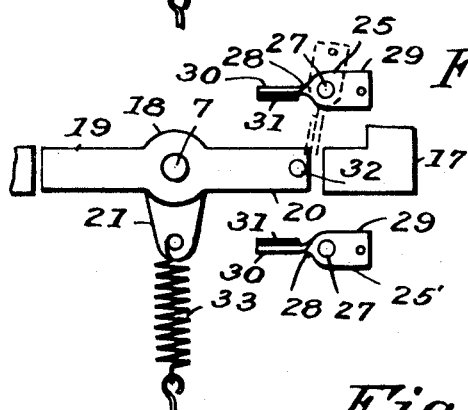
Fig. 4.
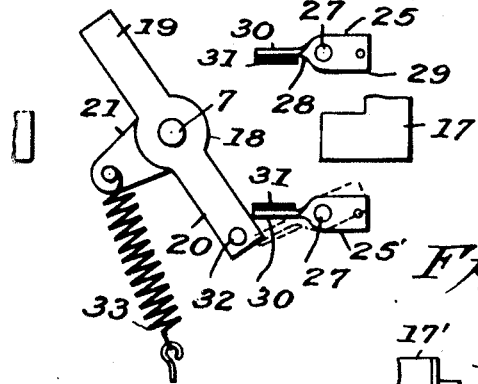
Fig. 5.
Fig. 7.
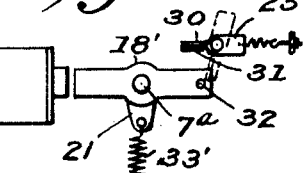
Fig. 9.
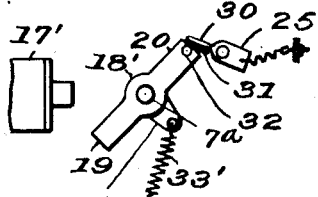
Fig. 10.
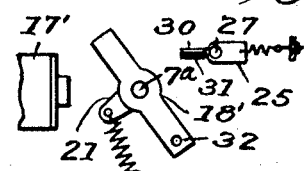
Fig. 11.
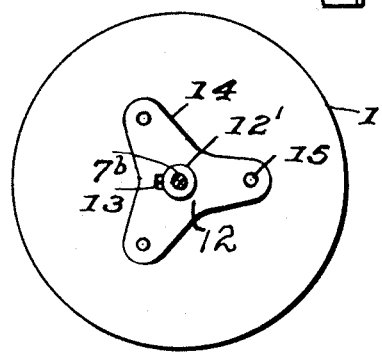
Fig. 6.
Inventor
Robert A. Webster.
By C. C. Hines,
Attorney Patented Dec. 13, 1938

2,140,438

UNITED STATES PATENT OFFICE 2,140,438

FILM DEVELOPING METHOD

Robert A. Webster, Santa Monica, Calif.

Application December 21, 1933, Serial No. 703,463

4 Claims. (Cl. 95—88)

This invention relates to a method of developing photographic film, and is particularly designed for the developing of photographic film in strip or cut form, such as motion picture film or kodak film.

It has become quite a common practice to employ small cameras using either motion picture film or narrow widths of kodak type film, and, owing to the fact that the pictures as made with these cameras are quite small, it is necessary to make enlargements from such negatives in order to produce photographs of satisfactory size.

In the enlarging of small photographic images, it is necessary to develop the film in such a way as to produce the finest grain possible. A photographic image on a film is made up of minute grains or particles and the method of processing the film determines, to a large extent, the size of these particles or coarseness of such particles, which may show up as coarse, granular objects on the resulting enlarged photographic image.

There are several factors that are involved in making up a fine grain photographic image; among other things the type of developing agent used, length of development, temperature of solutions, rapidity of drying, etc. In order to produce the finest grain, all of these variables must be controlled. There are now very satisfactory developing formulae obtainable which, when properly used, will produce very good results.

I have discovered that by the use of certain developing solutions, and by agitation of the bath in a certain way, that the speed or time period of development may not only be materially hastened and rendered fixed or predetermined with a standard amount of agitation, under proper conditions such as temperature, composition of development, etc., but that films developed by my novel process of agitation are finer grained and more uniform in quality, are less apt to be streaked, and very rarely show such defects as air bubbles or spots due to settling or insufficient mixing of the developing bath. This is due apparently to the fact that components of the baths are kept uniformly in solution and prevented from settling, while at the same time during the development of the image minute amounts of gas are given off due to the chemical reaction and, as these gas bubbles are constantly removed by the agitating action from the surface of the film or emulsion, development proceeds with a better grain producing action and at a faster speed and with a greater degree of uniformity in excellence of quality.

One object of my invention, therefore, is to provide a novel method of agitating the film and solution during the process of development, whereby a more reliable and efficient developing motion is produced.

The invention consists of the developing method and steps thereof, set forth in the following specification and specifically pointed out in the claims, reference being had to the accompanying drawings, in which:—

Fig. 1 is a vertical section through one type of developing apparatus for carrying my invention into practical effect.

Fig. 2 is a horizontal section taken substantially on line 2—2 of Fig. 1.

Fig. 2a is an enlarged detail view of the movable switch contacts and their adjustable carrier bracket plate.

Figs. 3, 4 and 5 are views showing the movements of the armature and its coaction with the contacts to effect oscillation of the developing receptacle by the apparatus.

Fig. 6 is a bottom plan view of the receptacle supporting pan or tray.

Fig. 7 is a view similar to Fig. 1 showing a modified form of the apparatus.

Fig. 8 is a plan view of the apparatus shown in Fig. 7 with the cover plate removed.

Figs. 9, 10 and 11 are views similar to Figs. 3, 4 and 5, showing the action of the armature and single contact employed in the structure disclosed in Figs. 7 and 8 for oscillating the receptacle supporting pan or tray.

While the method of my invention may be carried out by hand, using a suitable receptacle to contain the processing liquid and photographic subject-matter to be treated, for greater convenience and commercial purposes I preferably employ an apparatus expressly designed to impart the novel and peculiar processing motions characterizing the method to the processing liquid. I have shown herein one type of apparatus suitable for the purpose, including an electromagnetic motor shown, described and claimed per se in my copending application Serial No. 748,940, filed October 18, 1934, without, however, intending to limit the invention to the use of this particular type of motor.

In the practical embodiment of my invention herein disclosed for purposes of exemplification, therefore, I provide an apparatus for carrying my invention into practical effect comprising a pan or tray 1 of circular or other suitable form to receive and support a receptacle 2 designed to receive the film 3 which is to be developed, and which is immersed in the developing solution 4 therein. This receptacle may be provided with a suitable cover 5 and may be made of any suitable form and of any appropriate material not adversely affected by the developing solution. The film 3 may be disposed in this receptacle either in any suitable manner to expose the emulsion side of the film to the solution while preventing such side of any portion of the film from coming in contact with the walls of the container or any other portion of the film. The film, for example, when in strip condition may be spirally or otherwise wound upon a developing rack with its emulsion side outermost and its turns properly spaced or arranged to prevent contact of the emulsion sides of the film with each other. Preferably the pan or tray 1 is provided with an upturned guard flange 6 and is of suitably larger dimensions than the receptacle to catch and retain any amount of the developing solution which may unavoidably escape therefrom.

The pan or receptacle 1 is suitably supported upon the upper end of a supporting and operating shaft 7 which is journaled at its lower end in a bearing 8 in a casing 9 and extends at its upper end through and is journaled in a bearing 10 in a detachable lid or cover 11 designed to normally close said casing 9. Any suitable means for mounting the pan or tray upon the shaft may be employed. In the present instance the shaft is shown as comprising a lower section 7a and an upper section 7b, and the upper end of the upper shaft section is shown as provided with a supporting spider 12 having a central collar 12' embracing the shaft section 7b and secured thereto by a set screw 13 and a plurality of equidistantly arranged radial arms 14, preferably three in number, having sockets or receiving openings 15 therein to detachably receive positioning and coupling studs 16 depending from the base of the pan or tray. With this construction, the pan or tray may be readily detached at any time desired from the upper section of the shaft and the lid or cover 11 then opened to allow access to be conveniently secured to the interior of the casing 9 for installing, removing, cleaning or repairing any of the working parts contained therein. In practice, the casing and its cover may be made of either conducting or non-conducting material, and in either case the shaft 7 may be made of upper and lower sections as above described, which sections may be connected by a coupling collar or sleeve 7c of rubber or other non-conducting material pinned or otherwise fastened to the shaft sections and electrically insulating the same from each other so as to electrically insulate internal current conducting elements from exposed parts and thus prevent the transmission of shocks to persons handling the film and solution containing and supporting means. Preferably the receptacle 2 is independent of the pan or tray 1, that is, is not physically attached thereto but simply rests thereon, so that the receptacle and its contents may be applied and removed without the necessity of employing any fastenings. It will, of course, be understood that instead of a single receptacle a plurality of receptacles may be employed, all mounted at the same time within the pan or tray or upon the supporting spider, and the construction and arrangement of the receptacles may vary as desired so long as the principles of construction and operation of the apparatus are preserved.

It will be understood that the solution 4 is intended in accordance with my invention to be agitated so as to secure the beneficial actions stated on the film during the developing process. I therefore provide means for agitating the solution by imparting motion to the shaft 7 such as will agitate the developing fluid in a prescribed way.

I have found that maximum efficiency of operation is obtained by periodically and alternately rotating the shaft in opposite directions, that is to say, oscillating the shaft on its own axis, and thereby imparting back and forth motion in a curvilinear path or oscillation to the receptacle 2 and the developing fluid contained therein in a horizontal plane on a vertical axis. This motion may be fast or slow as occasion may require and will in practice be suitably governed to maintain all of the components of the solution in motion and in a state of solution and to cause the solution to flow back and forth through the film and against the surfaces thereof for a developing action therein. I preferably, however, use a reversible motor which has a quick or sudden reversing motion so as to give a sharp jerk at the end of each power stroke, whereby the agitation of the developing fluid is increased and the developing effect on the film increased to a material degree. As a result of agitating the solution while it is chemically acting upon the sensitive coating of the film, a physical washing action of the solution on the film is obtained whereby the developing action is facilitated and promoted, and at the same time all gases generated by reaction in the solution and tending to cling to the surfaces of the film are forced off and caused to pass to the surface of the solution and to be dissipated, and all the components of the solution are kept in a state of solution and prevented from separating out and causing streaking, spotting or uneven development of the film. The beneficial effect in these directions obtained by oscillation of the solution in a horizontal path about a vertical axis is much greater and much more effective, as my experiments and practical working operations have shown, than any other mode of agitation which might be employed since the washing action of the solution on the film produced by the oscillations of the fluid is in a horizontal plane and at an angle to the plane of any bubbles of gases which may be generated and arise, and in a proper direction to ensure maintenance of all particles of the developer in solution, so that rapid freeing of gases and developing action of the solution on the film is obtained without spotting, streaking or otherwise injuring the film.

The means for oscillating the shaft in the manner described disclosed in the structure shown in Figs. 1 to 6, inclusive, is in the form of an electric motor designed to impart two positive power strokes to the shaft on each cycle of operation. This motor comprises a horseshoe-shaped electromagnet 17 suitably supported within the casing, and within the gap and between the poles of which moves an armature 18 centrally secured to the shaft 7 and embodying oppositely extending longitudinally alined arms 19 and 20 and an arm 21 extending therefrom at right angles to said arms 19 and 20. The armature, magnet and shaft are included in an electric circuit comprising a conductor 22 connected to one of the terminals of the magnet coil, a conductor 23 connecting the other terminal of said coil with the shaft 7 and the armature 18, and a conductor 24 connected with a pair of switch contacts 25 and 25' respectively, which conductors 22 and 24 lead to a suitable socket or other connector 26 with which a switch or attachment plug or the like may be coupled for connecting the same with a source of electric supply.

Each switch member or switch contacts 25 and 25' comprises a contact plate or the like centrally pivoted upon an axis 27 for swinging movement and to provide oppositely extending contact and operating arms 28 and 29, respectively, the contact arm 28 having a contact face 30 and an insulated face 31 for cooperation with a contact pin or stud 32 on the armature arm 29. These contact members or switches are designed to be successively and alternately engaged by the pin 32 in the swinging movements of the armature 18 for the purpose of periodically and alternately cutting the electromagnet into and out of the circuit for the purpose of swinging the armature in opposite directions to produce two power strokes of the motor on each cycle of action, whereby oscillating motion is imparted to the shaft 7 and the receptacle 2 and the solution contained therein.

The arm 21 of the armature has attached thereto one end of a coiled controlling spring 33 the opposite end of which is attached to a swiveled anchoring and adjusting screw or bolt 34 carried by a supporting bracket 35, said spring operating to yieldingly oppose the swinging movements of the armature in opposite directions and to limit the throw of the armature in each of such directions and to bring it at the end of each power stroke to a predetermined position, ready for the starting of the next power stroke.

The operation of the motor will be readily understood by reference to Figs. 2 to 5, inclusive. Figs. 2 and 3 show the armature in one of its positions at the end of one power stroke, in which it lies at an angle across the field of the magnet with the contact face of switch 25 engaging pin 32, at which time the circuit is closed for the supply of current to the magnet. On the energization of the magnet the armature is moved from the position shown in Figs. 2 and 3 successively to the positions shown in Figs. 4 and 5. When the armature reaches the position shown in Fig. 4, in which it lies longitudinally in the magnetic field between the magnet poles, the pin 32 in its arc of swing with the contact face of the switch 25 passes beyond said contact face and on the same side of the switch on which its insulated face 31 is located, and in the further movement of the armature to the position shown in Fig. 5 it completes one power stroke. During this final movement of the armature the controlling spring 33 is brought from the angular position shown in Fig. 3, in which it lies at one side of the center of the arm 21 and normally maintains the armature in the position shown in Figs. 2 and 3, to the reverse position shown in Fig. 5 at the opposite side of the center of the arm 21 in which it checks the swing of the armature at the end of such power stroke and brings it into position to begin the succeeding opposite power stroke. In such movement of the armature on the said power stroke, the pin 32 on its arm 29 wipes past the insulated face of the switch 25' and comes into engagement with the contact face of said switch, as shown in Fig. 5. The electric circuit, which was broken when the pin 32 passed out of contact with the contact face of which 25, is now again closed, with the result of again energizing the magnet to attract the armature which has moved on its opposite power stroke or back to the position shown in Figs. 2 and 3, during which movements the contact pin 32 on its arm 29 wipes past the contact face of such member 25' and passes beyond the insulated face 30 of said switch member and is brought again into engagement with the contact face of switch member 25. The spring 33 checks the movement of the armature on this second or reverse power stroke and brings the pin 32 into engagement with the contact face of switch member 25, ready for a repetition of the two power strokes on the next cycle of operation, as will be readily understood.

The electromagnetic motor above described is one of reversible type which, due to its novel and peculiar construction and mode of operation, effects novel and peculiar motions of the processing mixture or solution and the action thereof on the photographic material being treated. This is due to the use of the reaction spring 33, the direct control of the switch 25 by the armature, and the control action of the switch 25 and associated means on the armature. It will be seen that as the armature nears the end of its working motion in one direction its stud 32 will engage the insulated face 31 on one side of the contact arm 28 of the switch 25 and that the switch will swing on its pivot 27 against the resistance of its controlling spring 31a. By this means the switch is caused to act as a cushioned brake or bumper which, while allowing the stud to pass beyond the face 31, abruptly stops the movement of the armature in such stroke direction. During this stroke or direction of movement of the armature the reaction spring 33 is tensioned. As a result, as soon as the stud 32 passes the face and the switch 25 is returned to its normal position by its spring, spring 33 in reaction will impart an abrupt or sudden change of stroke motion of the armature in the opposite direction, whereby the stud 33 is brought into engagement with the contact face 30 of the switch 25 to close the switch to supply current to the magnet. The armature will thereupon be impelled electromagnetically on the reverse stroke as a continuation of the stroke motion initiated by the reaction spring, the end of the one stroke thus being arrested by a sudden stop, the beginning of the reverse stroke initiated by a sudden start and these actions in reversing the armature stroke being effected without any appreciable period of pause or dwell between them. These stopping and starting motions at the end of one oscillation stroke and beginning of the reverse oscillation stroke are of cushioned character but may be as rapid as required and regulated as desired by the use of springs of different strengths and by governing the action of these springs by adjustment of their regulating means. As a result of these sudden braking and starting actions on the armature, which are transmitted to the receptacle 2, the mixture or solution 4 in the receptacle 2 is subjected, in addition to the normal forces exerted by the oscillating movements of the armature, to supplemental forces acting in rapid succession in opposite directions to produce in the flowing solution backlash motions and resultant vertical wave motions as a concomitant of these forces. The action of the apparatus and its effect on the solution, therefore, is materially different from apparatus of a type employing a motor rotating constantly in one direction and requiring the use of intervening motion changing means to obtain oscillating motions of the receptacle, in the operation of which motion changing means a pause or dwell necessarily occurs between motion changes. The surface of the film being treated is thus subjected to opposite washing actions in the direction of its length on each complete oscillation of the receptacle and a vertical washing action in a transverse direction from edge to edge thereof at the ends of the oscillation strokes. This ensures even development of the film and the positive washing from the film surface, by longitudinal and transverse washing actions, of any portions of the solution which have become chemically inactive and the constant subjection of the film to chemically active portions of the solution, thereby reducing the time period of treatment and enabling a finer and more uniform grain surface to be obtained. It has been found that where a constant relative movement between the film and a processing solution occurs, that portions of the solution which have been active on one part of the film surface and have become exhausted chemically in flowing from such portion of the film to another cause a dragging of the grain crystals in the film emulsion, that is to say, a dragging of the grain, which of course is very objectionable. This objection is overcome through the novel action of my apparatus, since the motion of the solution over the film, first in one direction longitudinally and then in the other direction longitudinally, and also edgewise of the film, causes an even distribution of chemically active portions of the solution, which are maintained in an intimately mixed state by the peculiar agitating action set up. It will be observed that these actions of the solution are obtained by motions of the solutions produced by the peculiar oscillating action set up, thus avoiding the necessity of employing paddles, baffles or other auxiliary agitators in the receptacle or of physically raising and lowering the film in the solution by power means for the purpose of securing a cross wise washing action of the solution on the film.

As shown, the contacts 25, 25' are preferably mounted on a bracket plate 25a having slots 25b for passage of clamping screws 25c entering an insulated plate 25d carried by the cover 11, whereby the contacts are rendered adjustable as a unit to vary the point of contact of the contact faces 19 with the contact pins 32. By this means the period of engagement of the contacts and power and duration of the power strokes may be varied and regulated to the degree required in any service action.

It will thus be seen that the invention provides simple, reliable and efficient means in the form of a reversible electric motor of simple type, the field of which is alternately energized to effect reverse power movements of an armature which converts opposite rotary motion to the developing solution receptacle and solution to secure the novel and advantageous working action of the solution on the film hereinbefore set forth. It will also be understood that the construction is such that by means of the socket or connector 28 the apparatus may be plugged in to any current supply circuit to start the apparatus into operation whenever required. It will, of course, be understood that the casing 9 and its cover and other proper parts may be suitably insulated from the electrical contacts and conducting connections, or that the casing and its cover may be made in whole or part of metal or conducting material, and insulated with other required parts of the apparatus from the coacting electrical conducting parts thereof. All parts of the apparatus which may possibly be injured by chemical action of the developing solution may, of course, be made of a material proof against such action.

In the modified form of apparatus shown in Figs. 7 to 11, inclusive, an ordinary form of electromagnet 17' is shown, which cooperates with an armature 18' on the shaft 7', which armature is electrically operated in one direction only, that is, on one of its power strokes, and is operated by a spring in the opposite direction or on its reverse power stroke. The armature 18' may be of the same structure as the armature 18, but only a single contact switch 25 is provided for cooperation with the pin 32, which imparts motion to the armature in one direction, the armature being impelled in the reverse direction by the action of a combined controlling and power or motor spring 33' having a controlling function similar to spring 33 but also operating as a motor spring. In the operation of this form of the apparatus it will be seen that when the parts are in the position shown in Fig. 8, the circuit will be closed to energize the magnet for movement of the armature on its electrically driven power stroke from the position shown in Fig. 8 to the position shown in Fig. 11. Between these positions the pin 32 on the armature arm 20 wipes past the contact face of the switch member 25 and swings by inertia to the position shown in Fig. 11, thus placing under tension the spring 33 which immediately swings the armature back on its opposite power stroke to the position shown in Fig. 8, ready for a repetition of the power stroke operations above described. This form of the apparatus may be used under some conditions, as for driving an apparatus of small type in which a limited quantity of film is developed at a time and which, accordingly, does not require much power to operate it.

While the construction of the device may be such that upon letting on the supply of current, as by means of a switch, the device will start and continue its operation automatically, the construction in the present instance is such that it is necessary to turn the mechanism by hand through part of one turn in order to make the first contact, after which time it works automatically. When the device is not in operation the tension of spring 33 keeps the armature in line with the poles of the magnet, so that a preliminary movement thereof is necessary to make the first contact, as above set forth.

It will be observed that the method of making contact between the pin 32 and the switch members 25 and 25' is in the nature of a wiping action which tends to keep the contact surfaces bright and increases the certainty of contact action as well as the durability of the contact elements.

As stated, because of the type of motor used, as well as the type of switch mechanism used, a jerky action is produced at the end of each half oscillation which tends to set up a back lash or sloshing of the solution in the direction of its partly circular path of motion, with the result that the agitation of the solution is greatly increased, with the resultant increase in the efficiency of its developing action.

While the device is designed especially for the treatment of film in strip form, it is also adapted for the development of so-called cut film, namely, film in sheet form and fairly flat. In the development of film in this form it is customary to place several pieces in a tray of developer at one time and without any attempt to separate them except by constantly moving them about in the tray. The present device may be used for the tray development of cut film by mounting the tray on the oscillating table and causing the individual pieces of cut film to constantly move around in the solution with respect to each other.

From the foregoing description, taken in connection with the accompanying drawings, my improved method of developing films and the construction, mode of operation and advantages of the apparatus employed therefor will be readily understood by those versed in the art without a further and extended description.

By means of the adjustable anchor screws or bolts connecting the controlling springs to their connecting brackets or the like, the power action of the springs may be varied to regulate their working power and speed of operation within certain limits, as will be readily understood.

What I claim is:—

1. The method of processing photographic film or like subject-matter by means of a processing solution, which consists in placing the film in a receptacle containing the solution, oscillating the receptacle by impulse actions horizontally about a vertical axis so as to effect current flow motions of the solution normal to such directions of motion of the receptacle during major portions of the oscillation strokes, and imparting to the receptacle in quick succession at the end of an oscillation stroke and beginning of the reverse oscillation stroke abrupt vibratory stopping action and an abrupt vibratory starting action respectively causing momentum and inertia reaction currents in the solution supplemental to and perpendicular to the plane of the normal flow motions of the solution.

2. The improvement in the power method of processing photographic film in a receptacle containing a processing solution and wherein the receptacle is oscillated by power impulses in a horizontal plane about a vertical axis to cause normal flow motions of the solution incident to the back and forth oscillation strokes of the receptacle, which consists in applying power to effect an impulse stroke at a point close to but beyond the starting point in each stroke direction, cutting off the application of power close to but short of the end of the stroke in each direction, and applying a reaction force to resiliently and abruptly arrest the motion of the receptacle at the end of a stroke when the power is cut off and to produce an abrupt reverse motion of the receptacle as an initiatory part of the motion of the reverse stroke between the starting point and power applying point on such stroke, whereby due to said sudden starting and stopping actions at the end of a stroke and beginning of the reverse stroke shock vibration motions of the receptacle supplemental to the stroke motions are produced to modify the normal flow directions of the solution.

3. The method of processing photographic film, which consists in disposing the film in a receptacle containing a processing solution so as to be subjected to the flow actions of the processing solution therein, oscillating said receptacle in a horizontal plane about a vertical axis by applying power impulses thereto to effect the oscillation strokes and to produce normal flow motions of the solution incident to such strokes, cutting off the power impulse near the end of a stroke in one direction and allowing the receptacle to complete such stroke by momentum, causing by resilient reaction producing means a sudden jarring stop of the movement of the receptacle on the momentum part of such stroke and a sudden reaction movement of the receptacle in the reverse direction and on the initial part of the reverse oscillation stroke of the receptacle, and applying a power impulse as a pick up of the reaction movement to continue the movement of the receptacle on such reverse stroke, whereby through said sudden stop, reaction and pick up actions auxiliary vibrations are produced in the movements of the receptacle to produce added flow change motions in the solution.

4. The hereindescribed method of processing photographic film and like photographic material, which consists in placing the material in a receptacle containing a processing solution, oscillating said receptacle in a horizontal plane about a vertical axis by imparting thereto a driving impulse in each stroke direction less than the length of the stroke and starting and ending at points spaced predetermined distances from the beginning and end of the stroke, whereby to produce in the solution flow motions normal to the directions of motion of the receptacle under the action of the driving impulses, and establishing under the force of a driving impulse in a stroke direction elastic resistance and reaction forces and utilizing said resistance and reaction forces in rapid succession and without pause or dwell therebetween to abruptly arrest the momentum of the receptacle at the end of the driving impulse in such stroke direction and to then abruptly reverse the motion of the receptacle up to the point of the beginning of a driving impulse in the opposite stroke direction, whereby through such stroke impulse stopping and starting actions and such intertervening momentum arresting and reaction starting actions abrupt auxiliary actions of the receptacle are produced causing counteractant motions in the liquid supplemental to the normal flow motions and operating to prevent settling of the components of the solution and to promote the grain producing action of the solution.

ROBERT A. WEBSTER.